(12) United States Patent (10) Patent No.: US 9,250,731 B2
Kim et al. (45) Date of Patent: Feb. 2, 2016

(54) DISPLAY DEVICE AND DRIVING METHOD THEREOF

(71) Applicant: LG Display Co., Ltd., Seoul (KR)

(72) Inventors: Tae Hwan Kim, Goyang-si (KR); Young Joon Lee, Goyang-si (KR); SunYeop Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 41 days.

(21) Appl. No.: 14/310,795

(22) Filed: Jun. 20, 2014

(65) Prior Publication Data

US 2015/0002421 A1 Jan. 1, 2015

(30) Foreign Application Priority Data

Jun. 28, 2013 (KR) ........................ 10-2013-0075827

(51) Int. Cl.
*G06F 3/041* (2006.01)
(52) U.S. Cl.
CPC ..................................... *G06F 3/041* (2013.01)

(58) Field of Classification Search
None
See application file for complete search history.

(56) References Cited

U.S. PATENT DOCUMENTS

2013/0335367 A1\* 12/2013 Kim ..................... G09G 3/3696
345/174

\* cited by examiner

*Primary Examiner* — Kenneth B Lee, Jr.
(74) *Attorney, Agent, or Firm* — Fenwick & West LLP

(57) ABSTRACT

Disclosed are a display device and a driving method thereof. The display device includes a first common electrode line connected to a first common electrode of a plurality of common electrodes, and formed to overlap a data line formed in a panel where the plurality of common electrodes are formed. The plurality of common electrodes are separated from each other in a block form, receive a common voltage in an image output period, and receive a touch driving voltage in a touch sensing period. The display device includes a second common electrode separated from the first common electrode line with a protective layer therebetween, and configured to include two second common electrode plates which are separated from each other in a left and right direction with respect to the first common electrode line.

10 Claims, 13 Drawing Sheets

DISPLAY DEVICE AND DRIVING METHOD
THEREOF

CROSS-REFERENCE TO RELATED
APPLICATIONS

This application claims the benefit of the Korean Patent Application No. 10-2013-0075827 filed on Jun. 28, 2013, which is hereby incorporated by reference as if fully set forth herein.

BACKGROUND

1. Technical Field

The present disclosure relates to a display device and a driving method thereof, and more particularly, to a display device including a panel with a built-in touch panel and a driving method thereof.

2. Discussion of the Related Art

Touch panels are a type of input device included in or built into display devices such as liquid crystal display (LCD) devices, plasma display panels (PDPs), organic light emitting display device (OLED), and electrophoretic displays (EPDs). A touch panel enables a user to input information by directly touching a screen of a display device with a finger, a pen or the like while looking at the screen of the display device.

Particularly, the demand for display devices integrated with in-cell type touch screens is recently increasing. In-cell type touch screens include a plurality of built-in elements configuring the touch screen for slim portable terminals such as smart phones and tablet personal computers (PCs).

In-cell type display devices may be categorized into mutual display devices and self-capacitive display devices.

FIG. 1 is an exemplary diagram illustrating a configuration of a related art mutual display device. FIG. 2 is an exemplary diagram illustrating a related art self-capacitive display device. FIG. 3 is an exemplary view illustrating a cross-section taken along line C-C' of FIGS. 1 and 2.

A mutual display device 10, as illustrated in FIG. 1, includes: reception electrodes RX1, RXn-1, RXn (collectively referred to herein as a reception electrode RX) formed in a block form in parallel with a data line in a display area A of a panel; driving electrodes TX1, TXm-1, TXm (collectively referred to herein as a driving electrode TX) configured with a plurality of driving electrode parts 11 which are disposed with the reception electrode RX therebetween, and is formed in parallel with a gate line in the display area A; a display driver 19 that is provided in a non-display area B of the panel that controls the data line and the gate line, and applies a common voltage or a touch driving voltage to the driving electrode TX and the reception electrode RX; a reception electrode line 15 that extends from the reception electrode RX, and is connected to the display driver 19; a driving electrode line 12 that extends from the driving electrode TX in parallel with the data line, and is connected to the display driver 19; and a touch driver (not shown) that determines whether there is a touch, by using the driving electrode and the reception electrode which are connected to the touch driver through the display driver.

A self-capacitive display device 20, as illustrated in FIG. 2, includes: a plurality of touch electrodes 21 that are formed in a display area A of a panel; a display driver 29 that is provided in a non-display area B of the panel, and drives the touch electrodes 21; and a touch driver (not shown) that is connected to the touch electrodes 21 through the display driver 29, and determines whether there is a touch. In this case, in each of the touch electrodes 21, a touch electrode line 22 is formed in parallel with the data line. Also, when the number of width-direction touch electrodes is Q number and the number of height-direction touch electrodes is P number, the touch driver (not shown) includes a total of n (where n is Q×P) number of sensing units.

In the display device, a cross-sectional surface taken along line C-C' of FIGS. 1 and 2 is as illustrated in FIG. 3. Referring to FIG. 3, in the in-cell type display device, a gate insulating layer 10b (20b) is coated on a base substrate 10a (20a), and a data line 10c (20c) is formed thereon. A buffer layer 10d (20d) is coated on the data line 10c (20c), and an insulating layer 10e (20e) is formed thereon. The driving electrode line 12 (or the touch electrode line 22) and a pixel electrode 10f (20f) are formed on the insulating layer 10e (20e), a protective layer 10g (20g) is coated thereon, and the driving electrode part 11 (or the touch electrode 21) is formed thereon. In FIG. 3, units Nos. 10 to 19 denote elements of the mutual display device illustrated in FIG. 1, and units Nos. 20 to 29 denote elements of the self-capacitive display device illustrated in FIG. 2. In FIG. 3, as an example of the driving electrode parts 11, a #(m,1)th driving electrode part 11b of FIG. 1 is illustrated, and as an example of the touch electrodes 21, a #Pth touch electrode 21b of FIG. 3 is illustrated.

Here, referring to FIGS. 1 to 3, the driving electrode line 12 connected to a #(1,1)th driving electrode part 11a is disposed with the protective layer 10g between the driving electrode line 12 and the #(m,1)th driving electrode part 11b.

Also, referring to FIGS. 1 to 3, the touch electrode line 22 connected to a #1st touch electrode 21a is disposed with the protective layer 20g between the touch electrode line 22 and a #Pth touch electrode 21b.

During a touch sensing period, in the mutual display device of FIG. 1, different touch driving voltages are supplied to the #(1,1)th driving electrode part 11a and the #(m,1)th driving electrode part 11b, and thus, as illustrated in FIG. 3, a parasitic capacitance D is generated between the driving electrode line 12 connected to the #(1,1)th driving electrode part 11a and the #(m,1)th driving electrode part 11b.

Moreover, during the touch sensing period, in the self-capacitive display device of FIG. 2, the same touch driving voltage is supplied to the #1st touch electrode 21a and the #Pth touch electrode 21b, but since the touch electrode line 22 connected to the #1st touch electrode 21a is adjacent to the #Pth touch electrode 21b, as illustrated in FIG. 3, the parasitic capacitance D is generated.

The parasitic capacitance D can cause noise. Due to the noise, a touch sensitivity can be reduced, or a touch error can occur.

In the related art mutual display device and the self-capacitive display device, during the touch sensing period, the driving electrode part 11 and the driving electrode line 12 or the touch electrode 21 and the touch electrode line 22 are parallelly disposed with the protective 10g or 20g therebetween, and for this reason, the parasitic capacitance D that is a cause of noise is generated between the two elements.

FIG. 4 is a waveform diagram showing an image output ('display') period and a touch sensing ('Touch') period in the related art in-cell type display device, and FIG. 5 is an exemplary diagram showing a waveform of a touch driving voltage supplied to a driving electrode and a reception electrode in the related art mutual display device.

In the related art mutual display device and self-capacitive display device, as shown in FIG. 4, the image output period and the touch sensing period are temporally divided (e.g., mutually distinct, non-overlapping, and optionally, interleaved).

Particularly, a touch panel applied to the mutual display device of FIG. 1 includes a driving electrode TX, which receives the common voltage (Vcom) in the image output ('display') period and receives the touch driving voltage in touch sensing period, and a reception electrode RX which receives the common voltage in the image output period, and receives a reference voltage in the touch sensing period.

In this case, in the touch sensing period of the mutual display device, block dim can occur in a panel of the mutual display device due to a difference between root mean square values (Vrms) of voltages respectively input to the driving electrode TX and the reception electrode RX.

That is, during the image output period, the common voltage Vcom is supplied to the driving electrode TX and the reception electrode RX.

However, during the touch sensing period, as shown in FIG. 5 (a), a pulse-type touch driving voltage is supplied to the driving electrode TX, and as shown in FIG. 5 (b), the reference voltage VRX_REF is supplied to the reception electrode RX. The touch driving voltage swings between the maximum value VTX_HIGH and the minimum value VTX_LOW. The value of VTX_LOW is also equal to the value of VRX_REF.

In this case, as shown in FIG. 5, a root mean square value TX_RMS of the touch driving voltage is a value between the common voltage Vcom and the maximum value VTX_HIGH. The reference voltage VRX_REF is the same as a root mean square value RX_RMS of the reference voltage. The root mean square value TX_RMS of the touch driving voltage differs from the root mean square value RX_RMS of the reference voltage.

Therefore, in the panel of the mutual display device, block dim can occur due to a difference between the root mean square values.

SUMMARY

Accordingly, the present disclosure is directed to provide a display device and a driving method thereof that substantially obviate one or more problems due to limitations and disadvantages of the related art.

An aspect of the present disclosure is directed to provide a display device and a driving method thereof, in which a plurality of common electrodes used as a touch electrode are formed in a block form, and a second common electrode is separated from a first common electrode line (connected to a first common electrode) with a protective layer between the first and second common electrodes and is configured with two second common electrode plates which are separated from each other and located on a left and a right side of the first common electrode line.

Another aspect of the present disclosure is directed to provide a display device and a driving method thereof, which generate the maximum value and minimum value of a touch driving voltage, supplied to a common electrode during a touch sensing period. An intermediate value between the maximum value and the minimum value by using a voltage is supplied from a data voltage generator generating a data voltage and from a voltage supplied from a gate voltage generator generating a gate voltage.

Additional advantages and features of these embodiments will be set forth in part in the description which follows and in part will become apparent to those having ordinary skill in the art upon examination of the following or may be learned from practice of these embodiments. The objectives and other advantages of the embodiments of this disclosure may be realized and attained by the structure particularly pointed out in the written description and claims hereof as well as the appended drawings.

To achieve these and other advantages and in accordance with the purpose of the disclosure, as embodied and broadly described herein, there is provided a display device including: a first common electrode line connected to a first common electrode of a plurality of common electrodes, and formed to overlap a data line formed in a panel where the plurality of common electrodes are formed. Electrodes of the plurality of common electrodes are separated from each other in a block form, the electrodes receive a common voltage in an image output period, and the electrodes receive a touch driving voltage in a touch sensing period. The display device also includes a second common electrode separated from the first common electrode line with a protective layer therebetween, and configured to include two second common electrode plates which are separated from each other and located on a left and right side of the first common electrode line.

In another aspect of the present disclosure, there is provided a method of driving a display device. The method includes supplying, during an image output period, a common voltage to the plurality of common electrodes which are separated from each other in a block form in the panel, where a plurality of data lines respectively receiving data voltages and a plurality of gate lines receiving a gate voltage are formed within the panel. The method further comprises supplying, in a touch sensing section of a touch sensing period, a touch driving voltage, having a maximum value and a minimum value which are generated from a voltage supplied from a data voltage generator generating the data voltages or a gate voltage generator generating the gate voltage, to a driving electrode of the plurality of common electrodes. The method also comprises, supplying, in a touch non-sensing section of the touch sensing period, an intermediate value of the maximum value and the minimum value to the driving electrode. Further, the method comprises determining whether there is a touch in the touch sensing section, by using a sensing signal received from a reception electrode of the plurality of common electrodes.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the exemplary embodiments of the present disclosure, examples of which are illustrated in the accompanying drawings. Wherever possible, the same reference numbers will be used throughout the drawings to refer to the same or like parts.

Hereinafter, embodiments of the present disclosure will be described in detail with reference to the accompanying drawings.

In this disclosure below, for convenience of description, a liquid crystal display (LCD) device will be described as an example of the present disclosure, but the present embodiments are not limited thereto. The present embodiments may be applied to various display devices which display an image by using a common electrode and a common voltage.

Figure 1:
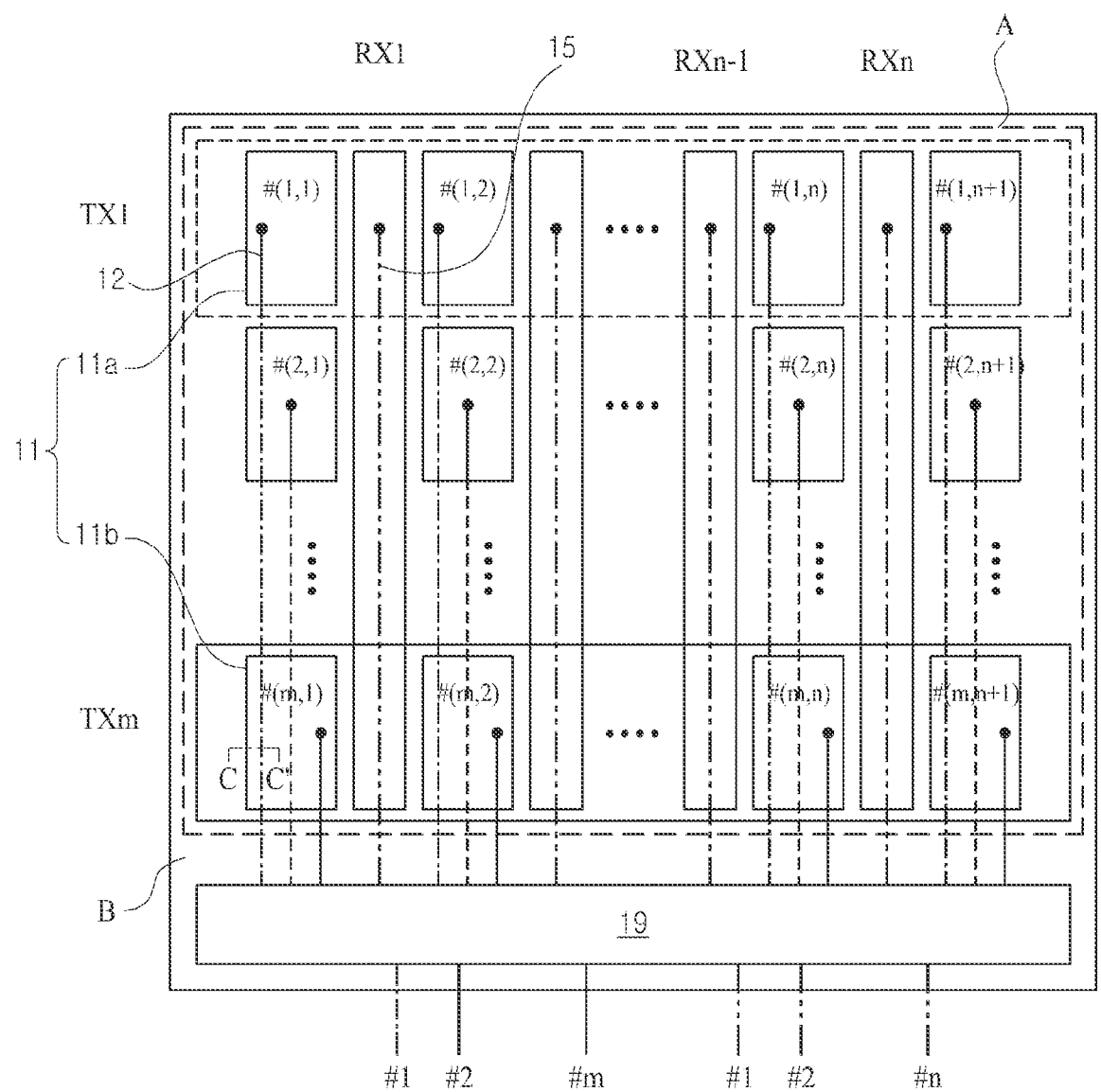
FIG. 1 is an exemplary diagram illustrating a configuration of a related art mutual display device.
Figure 2:
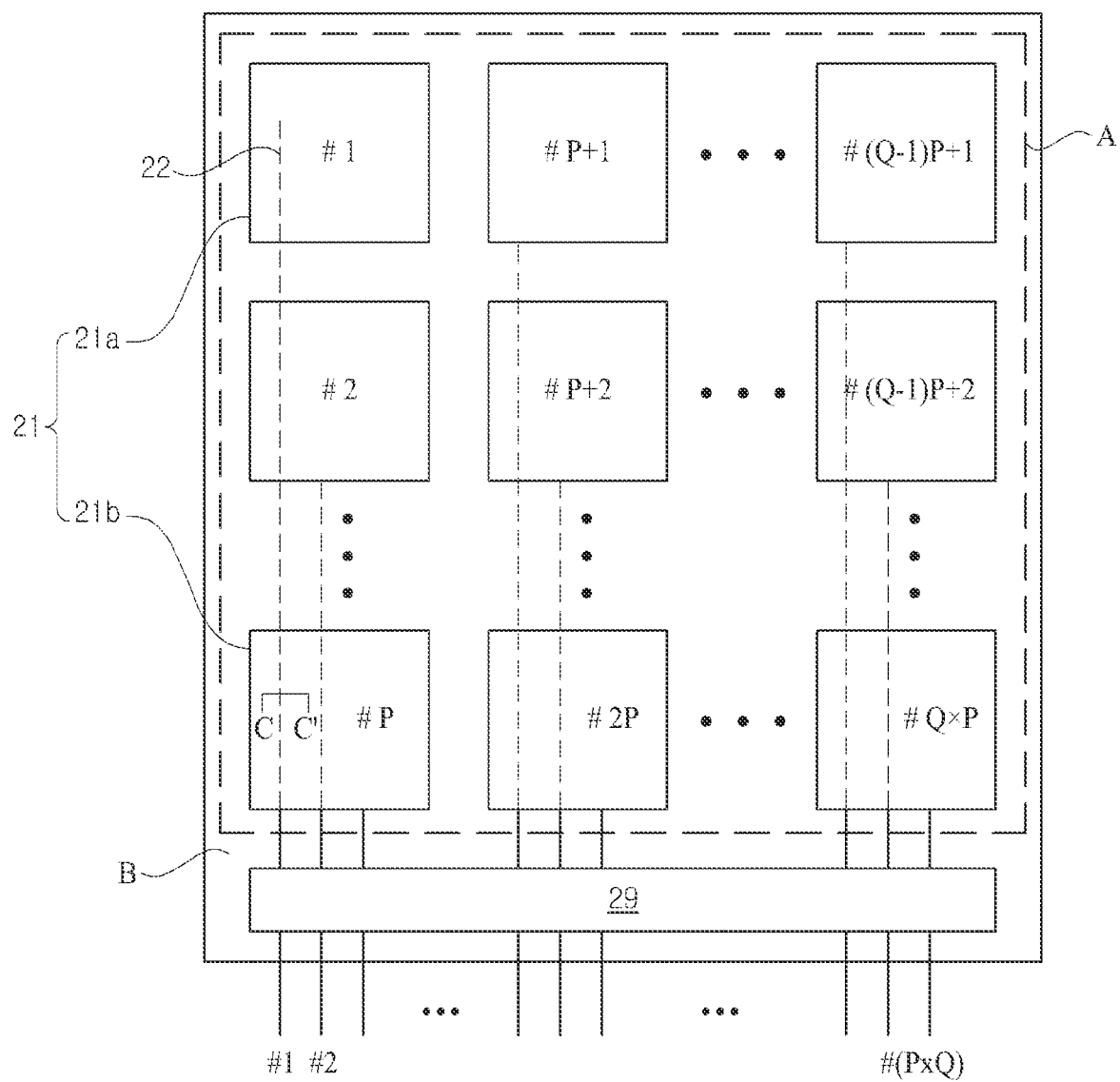
FIG. 2 is an exemplary diagram illustrating a related art self-capacitive display device.
Figure 3:
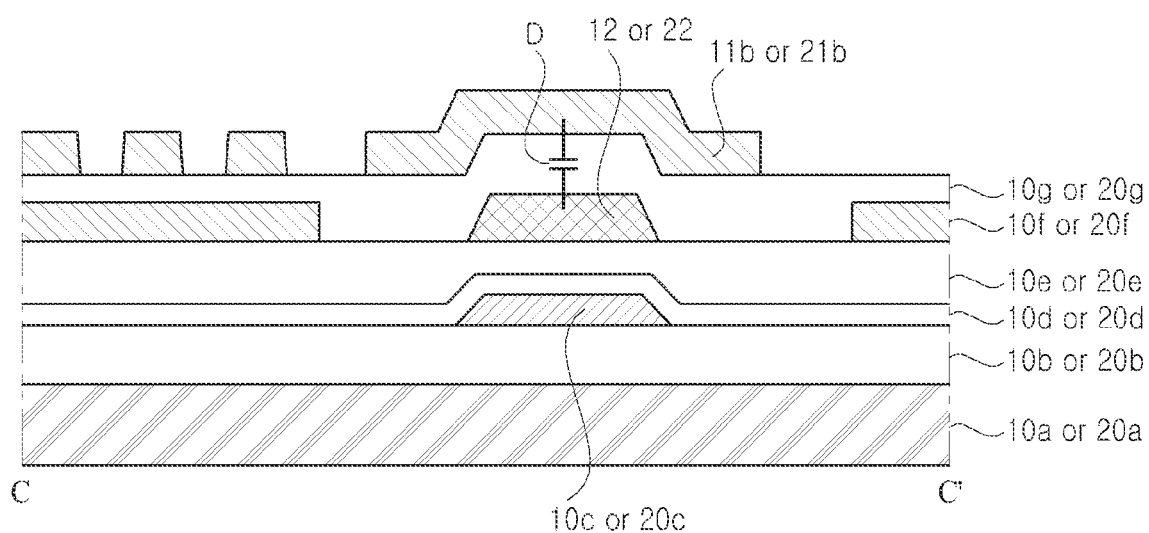
FIG. 3 is an exemplary view illustrating a cross-section taken along line C-C' of FIGS. 1 and 2.
Figure 4:
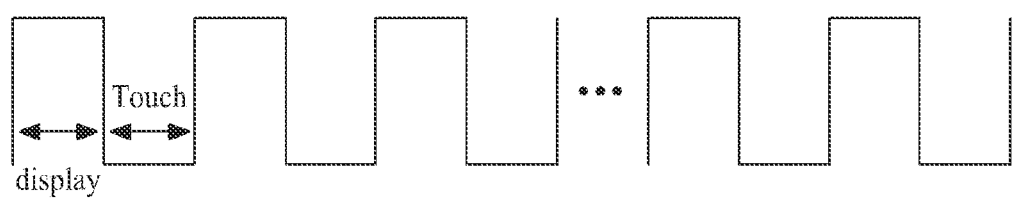
FIG. 4 is a waveform diagram showing an image output ('display') period and a touch sensing ('touch') period in the related art in-cell type display device.
Figure 5:
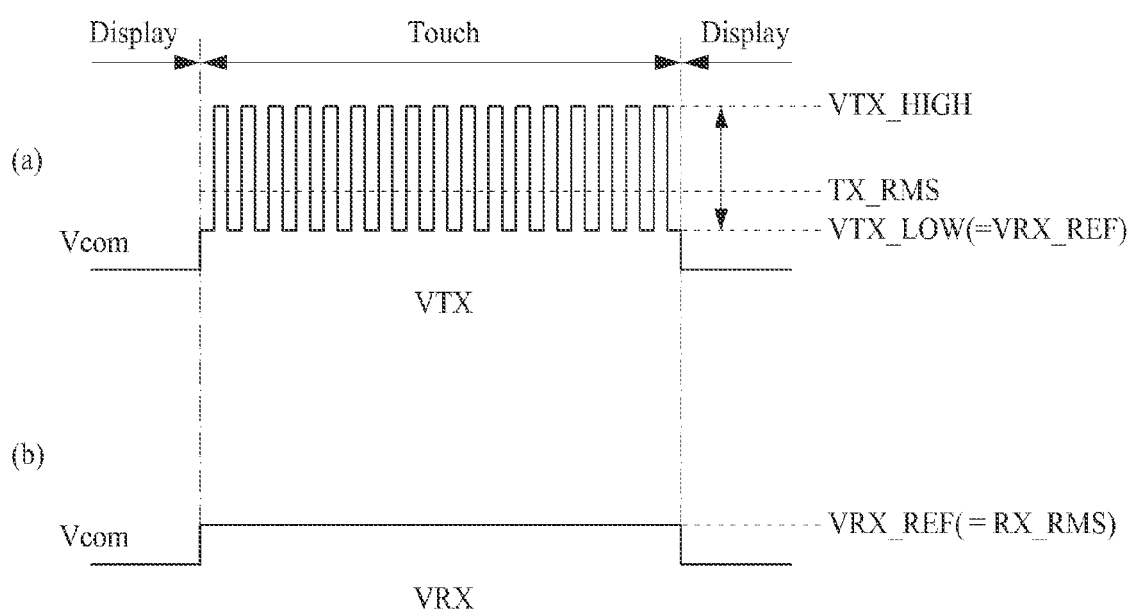
FIG. 5 is an exemplary diagram showing waveforms of touch driving voltages supplied to a driving electrode and to a reception electrode in the related art mutual display device.
Figure 6:
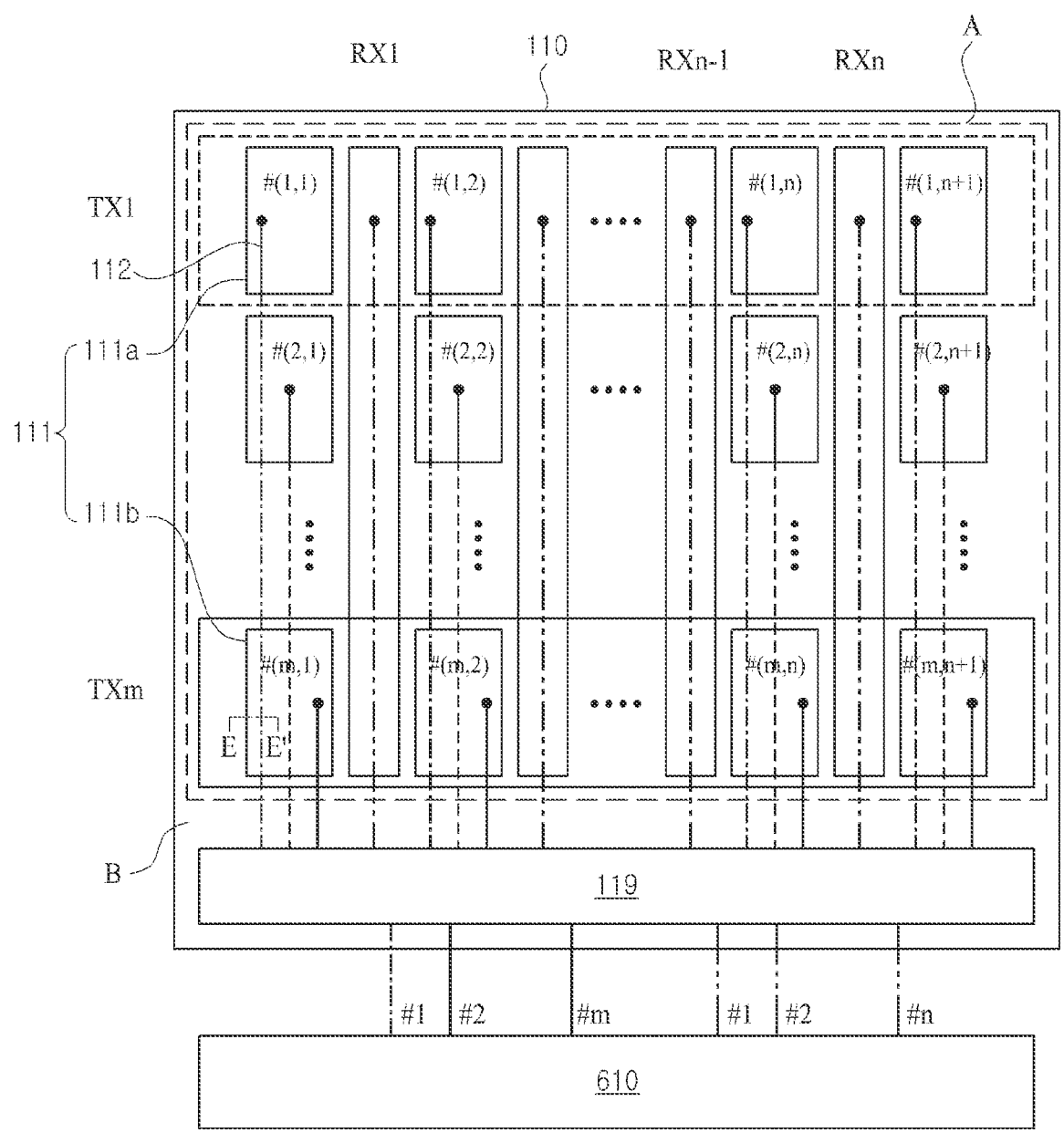
FIG. 6 is an exemplary diagram illustrating a configuration of a touch-sensing display device according to a first embodiment of the present disclosure.
Figure 7:
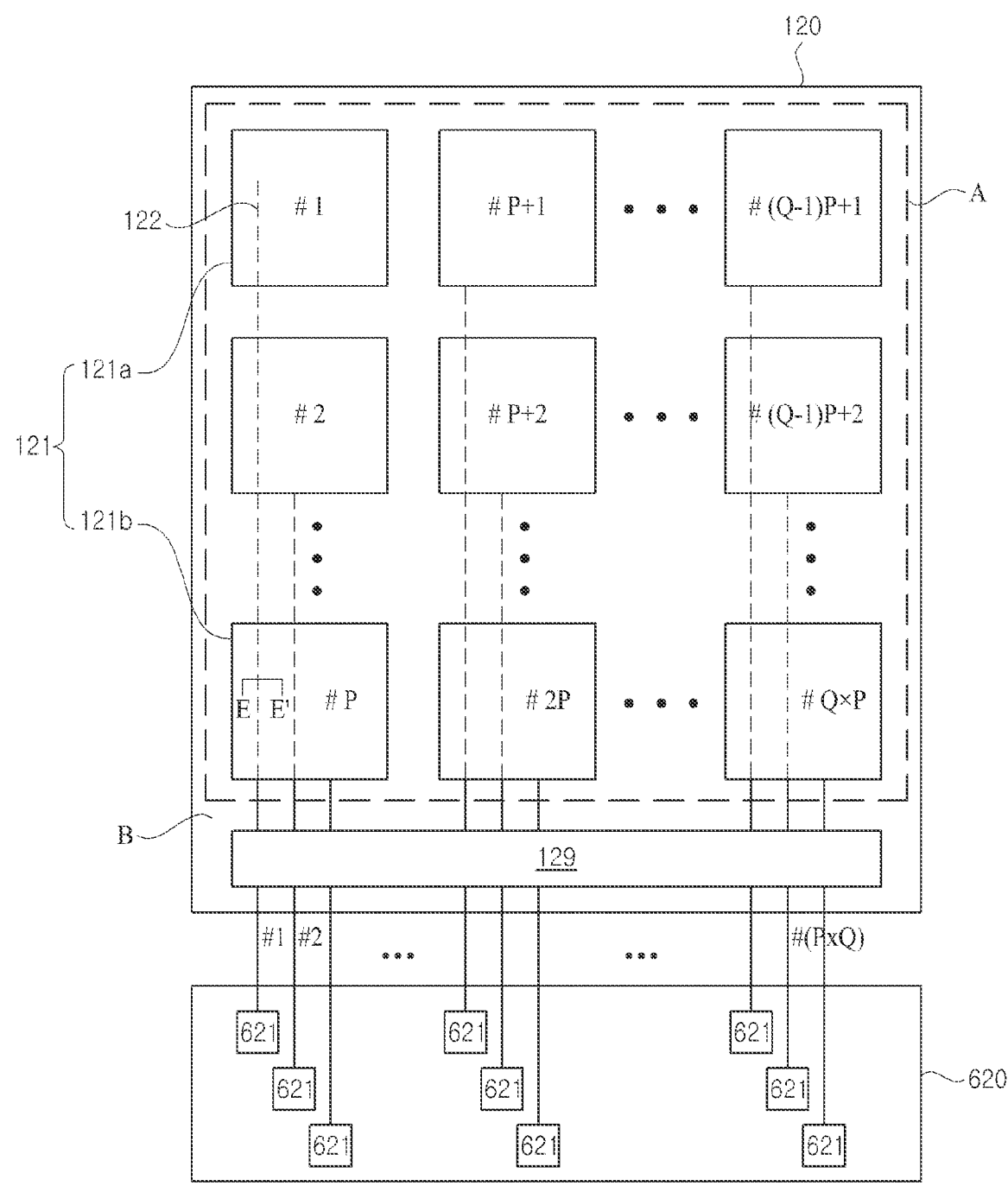
FIG. 7 is an exemplary diagram illustrating a configuration of a touch-sensing display device according to a second embodiment of the present disclosure.
Figure 8:
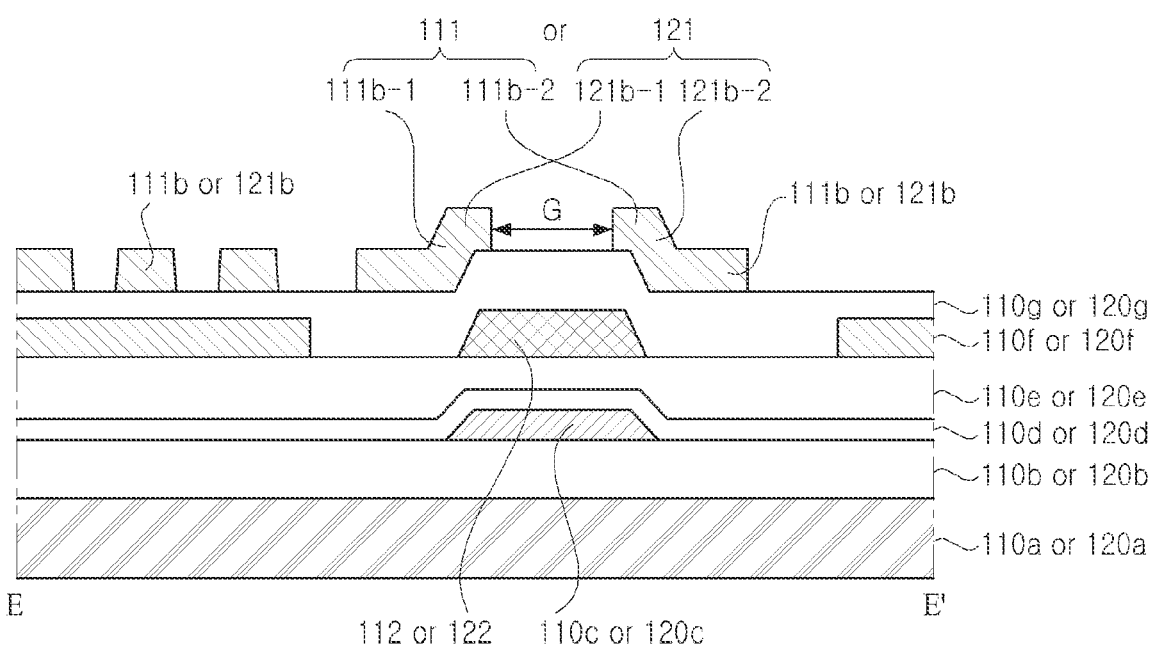
FIG. 8 is an exemplary view illustrating a cross-section taken along line E-E' of FIGS. 6 and 7.
Figure 9:
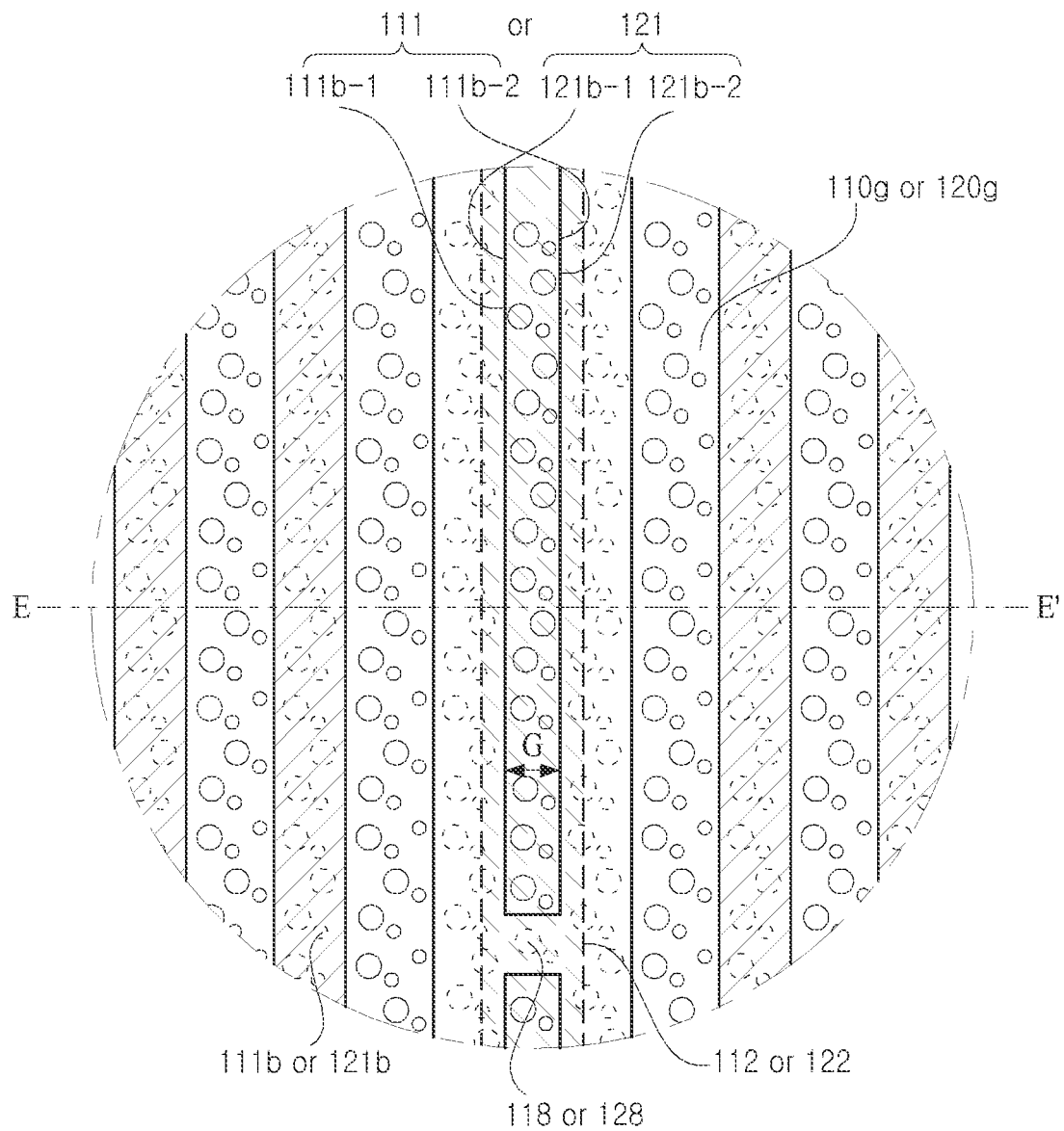
FIG. 9 is an enlarged diagram of a portion illustrated as line E-E' of FIGS. 6 and 7.

FIG. 6 is an exemplary diagram illustrating a configuration of a touch-sensing display device according to a first embodiment of the present disclosure, and illustrates a mutual display device. FIG. 7 is an exemplary diagram illustrating a configuration of a display device according to a second embodiment of the present disclosure, and illustrates a self-capacitive display device. FIG. 8 is an exemplary view illustrating a cross-section taken along line E-E' of FIGS. 6 and 7. FIG. 9 is an enlarged diagram of a portion illustrated as line E-E' of FIGS. 6 and 7.

The mutual display device according to the first embodiment of the present disclosure, as illustrated in FIG. 6, includes: a panel 110 that includes a plurality of common electrodes 111 which are separated from each other in a block form, receive a common voltage in an image output period, and receive a touch driving voltage in a touch sensing period; a touch driver 610 that, during the touch sensing period, generates a selection signal for generating the touch driving voltage, and determines whether there is a touch, by using a plurality of sensing signals respectively received from the common electrodes 111; and a display driver 119 that generates the touch driving voltage to supply the touch driving voltage to the common electrodes 111, and transfers the sensing signals (respectively received from the common electrodes 111) to the touch driver 610, according to a selection signal.

The panel 110 outputs an image in the image output period. In the touch sensing period, the panel 110 determines whether there is a touch.

The panel 110 includes an image panel and a touch panel.

The image panel outputs an image by using the common voltage supplied to the common electrode 111, and for example, may be configured as a liquid crystal panel.

The touch panel includes the plurality of common electrodes 111 which are separated from each other in a block form, receive the common voltage in the image output period, and receive a pulse-type touch driving voltage in the touch sensing period.

Referring to components of both FIGS. 6 and 8, the touch panel of the mutual display device of the first embodiment includes: a first common electrode line 112 which is connected to a first common electrode 111a of the common electrodes 111, and is formed to overlap a data line which is formed in the panel 110 with the common electrodes 111 formed therein; and a second common electrode 111b which is separated from the first common electrode line 112 with a protective layer 110g between the second common electrode 111b and the first common electrode line 112, and is configured with two second common electrode plates 111b-1 and 111b-2 which are separated from each other in a left and right direction with respect to the first common electrode line 112.

Hereinafter, for convenience of description, a case in which the first common electrode 111a is a #(1,1)th common electrode of the common electrodes 111 of FIG. 6, the second common electrode 111b is a #(m,1)th common electrode of the common electrodes 111 of FIG. 6, and the first common electrode line 112 is a common electrode line connected to the first common electrode 111a of a plurality of common electrode lines 112 illustrated in FIG. 6 will be described as an example of the present disclosure. Also, each of the first and second common electrodes 111a and 111b is configured with two common electrode plates, and particularly, the common electrode plates configuring the second common electrode 111b are the second common electrode plates 111b-1 and 111b-2.

To provide an additional description, the touch panel configuring the panel 110 includes the plurality of common electrodes 111, and each of the common electrodes 111 is connected to the common electrode line 112 connected to the display driver 119. Each of the common electrodes 111 includes the two common electrode plates 111b-1 and 111b-2.

Moreover, the common electrodes 111 include a plurality of reception electrodes RX1 to RXn, which are formed in a block form in parallel with the data line, and a plurality of driving electrode parts which are disposed in the panel 110 with a reception electrode therebetween, and are formed a block form.

That is, among the common electrodes 111 of FIG. 6, a plurality of common electrodes having a height-direction long block form are the plurality of reception electrodes RX1 to RXn, and a plurality of common electrodes which are formed between the reception electrodes RX1 to RXn are the driving electrode parts. The touch driving voltage is supplied to the driving electrode parts TX1 through TXm during the touch sensing period, and the reference voltage is supplied to the reception electrodes RX1 to RXn during the touch sensing period.

The driving electrode parts TX1 through TXm include the first common electrode 111a and the second common electrode 111b.

The driving electrode parts, which are formed in parallel with a gate line formed in the panel 110, configure one driving electrode TX. That is, a total of m number of driving electrodes TX1 to TXm are formed in the panel 110 of FIG. 6.

Here, the first and second common electrodes 111a and 111b are respectively included in different electrodes. That is, the first common electrode 111a (#1,1) is included in a first driving electrode TX1, and the second common electrode 111b (#m, 1) is included in a mth driving electrode TXm.

A configuration of the touch panel will be further described below.

Among the common electrodes 111 configuring the touch panel, the reception electrode RX is formed in a block form along the data line (not shown), for example, in a vertical (column) direction.

Among the common electrodes 111 configuring the touch panel, the driving electrode parts TX1 to TXm are formed as a checkered block between the reception electrodes RX. The plurality of driving electrode parts, which are formed along the gate line (not shown) formed in the panel 110, for example, in a horizontal direction (e.g., along a direction orthogonal to the orientation of the reception electrodes RX1 to RXn), configure one the driving electrode TX.

A common electrode line connected to each of the reception electrodes RX1 to RXn is formed in a non-display area B adjacent to the display driver 119, and connects the reception electrodes RX1 to RXn to the display driver 119.

That is, as illustrated in FIG. 6, the common electrode lines respectively connected to first to nth reception electrodes RX1 to RXn are connected to the display driver 119. In FIG. 6, it is illustrated that the common electrode line connected to the reception electrode is connected to an upper end (e.g., an end distal from the non-display area B) of each of the reception electrodes RX1 to RXn. However, the common electrode lines may be formed to be connected to the reception electrodes RX1 to RXn, at an end of each of the reception electrodes RX1 to RXn, namely, a portion adjacent to or proximal to the non-display area B.

The common electrode lines 112 respectively connected to the driving electrode parts 111 extend from the respective driving electrode parts 111 in a direction parallel to the data line or along the orientation (e.g., length) of the reception electrode, and are formed up to the non-display area B. The common electrode lines 112 are connected to the display driver 119, in the non-display area B.

The driving electrode parts 111, which are disposed on one horizontal (row) line and form one driving electrode TX, are electrically connected. In order for the driving electrode parts 111 to be electrically connected, as illustrated in FIG. 6, the common electrode lines 112 respectively connected to the driving electrode parts 111 configuring one driving electrode TX are formed in parallel with the data line or the reception electrode, and are connected in the non-display area B or the display driver 119.

To provide an additional description, in order for the driving electrode parts 111 configuring one driving electrode TX to be connected, the common electrode lines 112 respectively connected to the driving electrode parts 111 extend in a direction parallel to the data line or the along a length of reception electrode RX, are formed in the non-display area B which is formed at a lower portion of the panel 110, and are connected to one line in the non-display area B or the display driver 119. That is, the common electrode lines 112 respectively connected to the driving electrode parts 111 configuring one driving electrode TX are connected to one line. The same signal is applied to the driving electrode parts 111, connected to the common electrode lines 111 connected to one line, at the same time.

As described above, a method of applying the same signal to the driving electrode parts 111 configuring one driving electrode TX and a method of connecting the common electrode lines 112 for the same will be described with reference to FIGS. 11 to 14.

The driving electrode TX and reception electrode RX applied to the present disclosure apply the common voltage to the panel 110. That is, the common voltage is applied to the driving electrode TX and the reception electrode RX during the image output or display period where the panel 110 outputs an image. During the touch sensing period where a touch is sensed, the touch driving voltage is applied to the driving electrode TX, and a sensing signal is received through the reception electrode TX.

By using the panel 110 in which the common electrodes 111 and a plurality of pixel electrodes are all formed on a lower substrate, the common electrodes 111 may be used as the driving electrode part, configuring the driving electrode TX, and the reception electrode RX.

The display driver 119 controls the data line and the gate line, and applies the common voltage or the touch driving voltage to the driving electrode TX and the reception electrode RX. As illustrated in FIG. 6, the display driver 119 is connected to the driving electrode TX and the reception electrode RX through the common electrode line 112, and is also connected to the data line (not shown) and the gate line (not shown).

In order for the panel 110 to output an image, the display driver 119 generates a gate control signal GCS and a data control signal DCS by using a timing signal transferred from an external system, and realigns a plurality of input image data signals according to a structure of the panel 110.

The display driver 119 applies the common voltage to the driving electrode TX and the reception electrode RX during the image output period in which an image is output.

Moreover, the display driver 119 connects the reception electrode RX to the touch driver 610. That is, a sensing signal sensed through the reception electrode RX is transferred to the touch driver 610 through the display driver 119, and is analyzed by the touch driver 610.

An internal configuration and function of the display driver 119 will be described in detail with reference to FIGS. 11 to 14.

Finally, the touch driver 610 generates the selection signal and a touch driving pulse, which are used to generate the touch driving voltage. The touch driver 610 supplies the selection signal and the touch driving pulse to the display driver 119. By using a sensing signal received through the reception electrode RX, the touch driver 610 determines whether there is a touch, and analyzes a touched position.

An internal configuration and function of the touch driver 610 will be described in detail with reference to FIGS. 11 to 14.

The display device according to the second embodiment of the disclosure, as illustrated in FIG. 7, includes: a panel 120 that includes a plurality of common electrodes 121 which are separated from each other in a block form, receive a common voltage in an image output period, and receive a touch driving voltage in a touch sensing period; a touch driver 620 that, during the touch sensing period, generates a selection signal for generating the touch driving voltage, and determines whether there is a touch, by using a plurality of sensing signals respectively received from the common electrodes 121; and a display driver 129 that generates the touch driving voltage to supply the touch driving voltage to the common electrodes 121, and transfers the sensing signals (respectively received from the common electrodes 121) to the touch driver 620, according to a selection signal. Hereinafter, corresponding descriptions of the self-capacitive display device of the second embodiment (explained with reference to FIG. 6), which are the same as or similar to descriptions of the mutual display device according to the first embodiment (shown in FIG. 7) are not provided, for brevity, or will be briefly made.

The panel 120 outputs an image in the image output period. In the touch sensing period, the panel 120 determines whether there is a touch.

The panel 120 includes an image panel and a touch panel.

The image panel outputs an image by using the common voltage supplied to the common electrode 121, and for example, may be configured as a liquid crystal panel.

The touch panel includes the plurality of common electrodes 121 which are separated from each other in a block form, receive the common voltage in the image output period, and receive a pulse-type touch driving voltage in the touch sensing period.

Referring to components of both FIGS. 7 and 8, the touch panel of the self-capacitive display device of the second embodiment includes: a first common electrode line 122 which is connected to a first common electrode 121a of the common electrodes 121, and is formed to overlap a data line which is formed in the panel 120 with the common electrodes 121 formed therein; and a second common electrode 121b which is separated from the first common electrode line 122 with a protective layer 120g between the second common electrode 121b and the first common electrode line 122, and is configured with two second common electrode plates 121b-1 and 121b-2 which are separated from each other in a left and right direction with respect to the first common electrode line 122.

Hereinafter, for convenience of description, a case in which the first common electrode 111a is a #1st common electrode of the common electrodes 121 of FIG. 7, the second common electrode 111b is a #Pth common electrode of the common electrodes 121 of FIG. 7, and the first common electrode line 122 is a common electrode line connected to the first common electrode 121a of a plurality of common electrode lines 122 illustrated in FIG. 7 will be described as an example of the present disclosure. Also, each of the first and second common electrodes 121a and 121b is configured with two common electrode plates, and particularly, the common electrode plates configuring the second common electrode 121b are the second common electrode plates 121b-1 and 121b-2.

To provide an additional description, the touch panel configuring the panel 120 includes the plurality of common electrodes 121, and each of the common electrodes 121 is connected to the common electrode line 122 connected to the display driver 129. Each of the common electrodes 121 includes the two common electrode plates 121b-1 and 121b-2.

The common electrode lines 122 respectively connected to the common electrodes 121 are in a non-display area B adjacent to the display driver 129, and connects the common electrodes 121 to the display driver 129.

The common electrodes 121 according to the present embodiment apply the common voltage or a touch driving voltage to the panel 120. That is, the common voltage is applied to all the common electrodes 121 during the image output period in which an image is output, and during the touch sensing period in which a touch is sensed, the touch driving voltage is applied to all the common electrodes 121, and a plurality of sensing signals are respectively received through the common electrodes 121.

By using the panel 120 in which the common electrodes 121 and a plurality of pixel electrodes are all formed on a lower substrate, the common voltage or the touch driving voltage is supplied to the common electrodes 121.

The display driver 129 controls the data line and the gate line, and applies the common voltage or the touch driving voltage to the common electrodes 121. As illustrated in FIG. 7, the display driver 129 is connected to the common electrodes 121 through the common electrode line 122, and is also connected to the data line (not shown) and the gate line (not shown).

In order for the panel 120 to output an image, the display driver 129 generates a gate control signal GCS and a data control signal DCS by using a timing signal transferred from an external system, and realigns a plurality of input image data signals according to a structure of the panel 120.

The display driver 129 applies the common voltage to the common electrode 121 during the image output period in which an image is output, applies the touch driving voltage to the common electrodes 121 during the touch sensing period in which a touch is sensed, and transfers a plurality of sensing signals, respectively received from the common electrode 121, to the touch driver 620. That is, during the touch sensing period, the sensing signals sensed through the common electrodes 121 are transferred to the touch driver 620 through the display driver 129, and are respectively analyzed by a plurality of analyzers 621.

To this end, the display driver 129 applied to the self-capacitive display device may be implemented in various configurations.

During the touch sensing period, the touch driver 620 applies a pulse-type touch driving voltage to the common electrodes 121, and senses a touch of the panel 120 by using a time when the maximum value or minimum value of the touch driving voltage is shifted to a predetermined sensing voltage.

The touch driver 129 applied to the self-capacitive display device may be implemented in various configurations.

Hereinafter, a structure of the panel 110 (illustrated in FIG. 6) applied to the display device according to the first embodiment and a structure of the panel 120 (illustrated in FIG. 7) applied to the display device according to the second embodiment will be described with reference to FIGS. 6 to 9.

A cross-section of the device taken along line E-E' of FIGS. 6 and 7 is as illustrated in FIG. 8.

Referring to FIG. 8, in the panel 110 (or 120) applied to the first embodiment (or the second embodiment) of the present disclosure, a gate insulating layer 110b (120b) is coated on a base substrate 110a (120a), and a data line 110c (120c) is formed thereon. A buffer layer 110d (120d) is coated on the data line 110c (120c), and an insulating layer 110e (120e) is formed thereon. The driving electrode line 111 (or the touch electrode line 112) and a pixel electrode 110f (120f) are formed on the insulating layer 110e (120e), a protective layer 110g (120g) is coated thereon, and the driving electrode part 111 (or the touch electrode 121) is formed thereon. In FIG. 8, units Nos. 110 to 119 denote elements of the mutual display device illustrated in FIG. 6, and units Nos. 120 to 129 denote elements of the self-capacitive display device illustrated in FIG. 7.

In FIG. 8, as an example of the common electrodes 111 (121), the #(m,1)th common electrode part 111b of FIG. 6 is illustrated, and the #Pth common electrode 121b of FIG. 7 is illustrated.

Referring to FIGS. 6 and 8, the common electrode line (the first common electrode line) 112 connected to a #(1,1)th common electrode (or the first common electrode) 111*a* is disposed with the protective layer 110*g* between the common electrode line (the first common electrode line) 112 and the #(m,1)th common electrode (the second common electrode) 111*b*.

Referring to FIGS. 7 and 8, the common electrode line (the first common electrode line) 122 connected to a #1st common electrode (or the first common electrode) 121*a* is disposed with the protective layer 120*g* between the common electrode line (the first common electrode line) 122 and the #Pth common electrode (the second common electrode) 12 1b.

Here, the second common electrode 111*b* (121*b*) which is separated from the first common electrode line 112 (122) with the protective layer 110*g* (120*g*) therebetween is configured with two second common electrode plates 111*b*-1 and 111*b*-2 (121*b*-1 and 121*b*-2) which are separated from each other in a left and right direction with respect to the first common electrode line 112 (122).

That is, the second common electrode 111*b* (121*b*) is divided into the two second common electrode plates 111*b*-1 and 111*b*-2 (121*b*-1 and 121*b*-2) which are separated from each other with respect to an opening G overlapping the first common electrode line 112 (122).

Here, a width between the second common electrode plates 111*b*-1 and 111*b*-2 (121*b*-1 and 121*b*-2), namely, a width of the opening G, may be lesser than that of the first common electrode line 112 (122).

The two second common electrode plates 111*b*-1 and 111*b*-2 (121*b*-1 and 121*b*-2), as illustrated in FIG. 9, are connected to each other by a connection part 118 (128) in at least one region of the opening G overlapping the first common electrode line 112 (122).

Moreover, in FIGS. 8 and 9, the two second common electrode plates 111*b*-1 and 111*b*-2 (121*b*-1 and 121*b*-2) are electrically connected to the second common electrodes 111*b* (121*b*) which are respectively disposed at the left and right thereof.

During the touch sensing period, different touch driving voltages are supplied to the #(1,1)th common electrode (the first common electrode) 111*a* and the #(m,1)th common electrode (the second common electrode) 111*b*.

Moreover, during the touch sensing period, the same touch driving voltage is supplied to the #1st common electrode (the first common electrode) 121*a* and the #Pth common electrode (the second common electrode) 121*b*.

In this case, an area in which the first common electrode line 112 (122) connected to the first common electrode overlaps the second common electrode 111*b* (121*b*) can be minimized by the opening G.

Therefore, an influence of the touch driving voltage supplied to the first common electrode 111*a* (121*a*) can be minimized on the second common electrode 111*b* (121*b*), and an influence of the touch driving voltage supplied to the second common electrode 111*b* (121*b*) can be minimized on the first common electrode 111*a* (121*a*).

Therefore, noises included in sensing signals received through the first common electrode 111*a* (121*a*) and the second common electrode 111*b* (121*b*) can be minimized. Accordingly, a touch sensitivity of the touch driver 610 (620) can be enhanced, and a touch error can be reduced.

Figure 10:
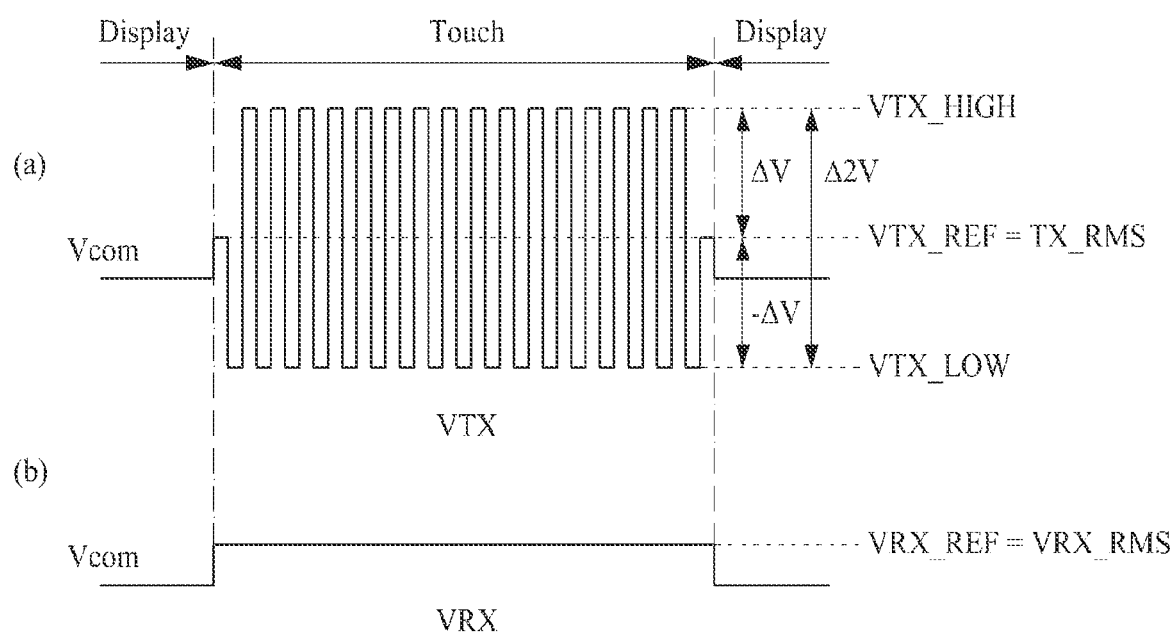
FIG. 10 is an exemplary diagram showing waveforms of voltages respectively supplied to common electrodes in the touch-sensing display device according to the first embodiment of the present disclosure.
Figure 11:
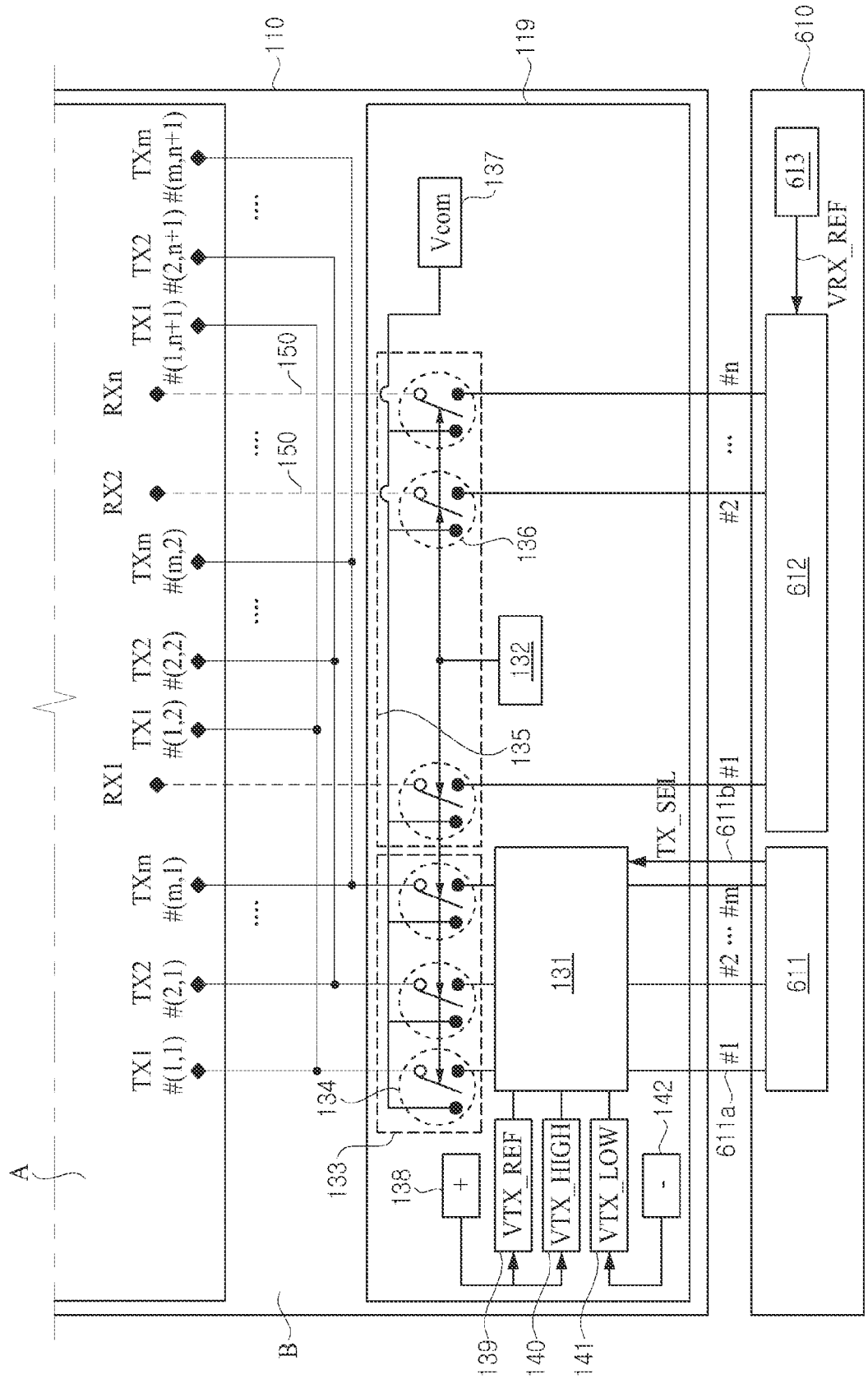
FIG. 11 is an exemplary diagram illustrating a configuration of a display driver applied to the display device according to the first embodiment of the present disclosure.
Figure 12:
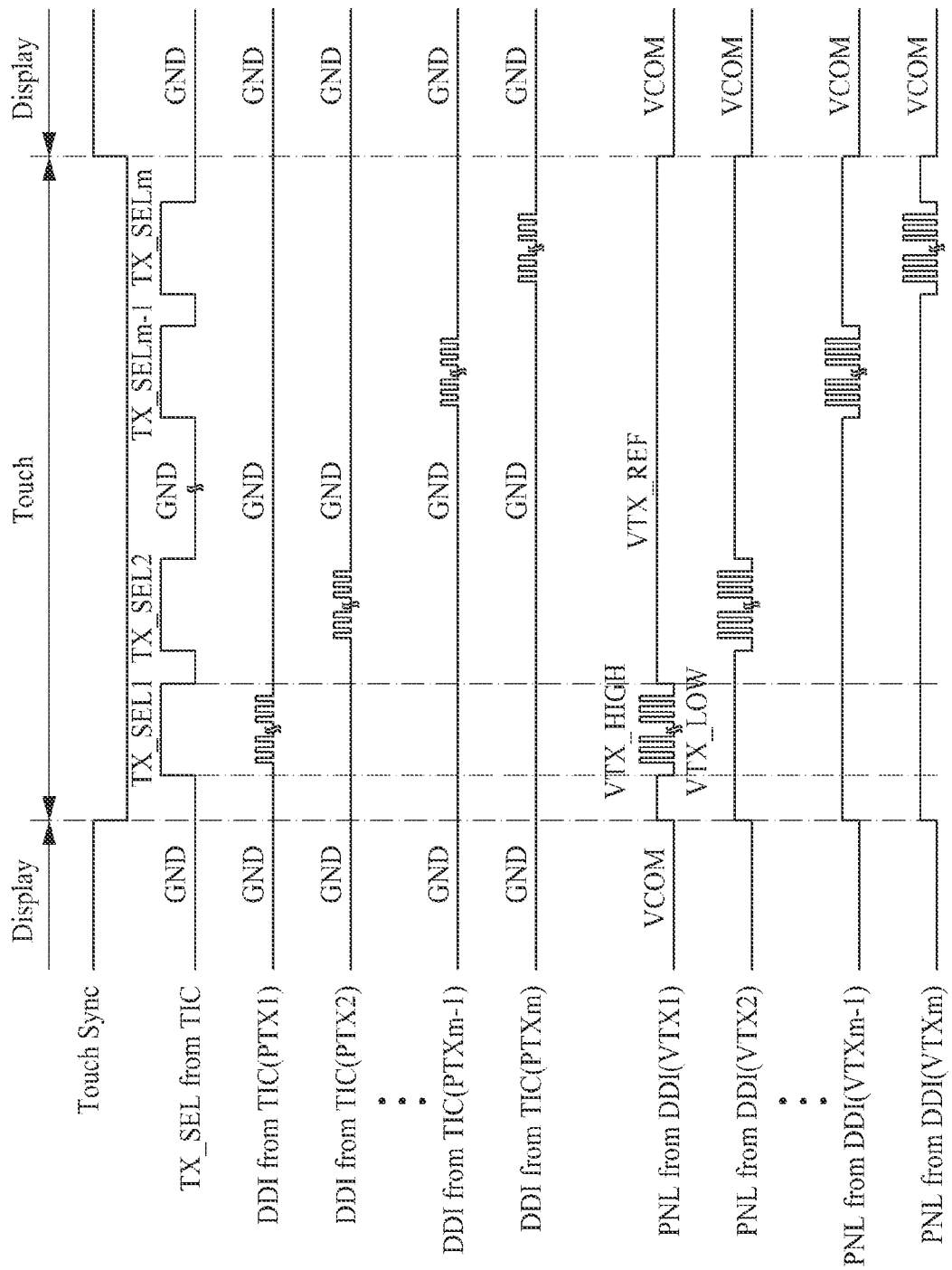
FIG. 12 is an exemplary diagram showing a touch driving voltage generated by the display driver of FIG. 11.

FIG. 10 is an exemplary diagram showing waveforms of voltages respectively supplied to common electrodes in the display device according to the first embodiment of the present disclosure. FIG. 10 (*a*) shows a touch driving voltage supplied to a driving electrode among the common electrodes, and FIG. 10 (*b*) shows a reference voltage supplied to a receiving electrode among the common electrodes. FIG. 11 is an exemplary diagram illustrating a configuration of a display driver applied to the display device according to the first embodiment of the present disclosure. FIG. 12 is an exemplary diagram showing a touch driving voltage generated by the display driver of FIG. 11.

The display device (e.g., illustrated in FIG. 6) according to the first embodiment is a mutual display device.

As described above, in the mutual display device and the self-capacitive display device, the image output period is separated from the touch sensing period.

Particularly, as shown in FIGS. 6 and 10, the touch panel 110 applied to the mutual display device according to the first embodiment of the present invention illustrated in FIG. 6 includes a driving electrode TX, which receives the common voltage Vcom in the image output ('Display') period and receives the pulse-type touch driving voltage in touch sensing ('Touch') period, and a reception electrode RX which receives the common voltage Vcom in the image output ('Display') period, and receives the reference voltage VRX_REF in the touch sensing ('Touch') period.

The maximum value VTX_HIGH and minimum value VTX_LOW of the pulse-type touch driving voltage VTX, supplied to the driving electrode TX in touch sensing period, and an intermediate value VTX_REF of the maximum value VTX_HIGH and the minimum value VTX_LOW may be generated from a voltage which is supplied from a data voltage generator, which generates a data voltage supplied to the data line, or a gate voltage generator which generates a gate voltage (a scan signal) supplied to the gate line.

The touch driving voltage VTX swings between the maximum value and the minimum value with respect to the intermediate value VTX_REF.

Therefore, a root mean square value TX_RMS of the touch driving voltage is the intermediate value VTX_REF.

Here, the intermediate value VTX_REF of the touch driving voltage VTX has the same value as that of the reference voltage VRX_REF that is a voltage VRX applied to common electrodes (i.e., the reception electrodes TX), to which the touch driving voltage is not supplied, among the plurality of common electrodes TX.

The reference voltage VRX_REF applied to the reception electrodes RX is a direct current (DC) voltage, and thus, a root mean square value RX_RMS of the reference voltage VRX_REF is the reference voltage.

Therefore, the root mean square value RX_RMS of the touch driving voltage VTX is the same as the root mean square value RX_RMS of the reference voltage VRX_REF. Accordingly, block dim cannot occur in the display device according to the first embodiment of the present disclosure.

Hereinafter, configurations and functions of the display driver 119 and the touch driver 610 for generating the touch driving voltage VTX and the reference voltage VRX_REF will be described in detail with reference to FIGS. 11 and 12.

First, when the image output period ends and the touch sensing period starts, the display driver 119 outputs the pulse-type touch driving voltage to common electrodes, which are included in one driving electrode TX among the plurality of common electrodes 111, in a touch sensing section of the touch sensing period in which a selection signal TX_SEL is received. When the touch sensing section of the touch sensing period ends, the display driver 119 outputs the reference voltage VRX_REF to the common electrodes included in the driving electrode TX.

To this end, as illustrated in FIG. 11, the display driver 119 includes: a positive voltage generator 138 that generates a positive (+) voltage; a negative voltage generator 142 that generates a negative (−) voltage; an intermediate value generator 139 that generates the intermediate value VTX_REF of the touch driving voltage by using the positive voltage; a maximum value generator 140 that generates the maximum value VTX_HIGH of the touch driving voltage by using the positive voltage; a minimum value generator 141 that generates the minimum value VTX_LOW of the touch driving voltage by using the negative voltage; a common voltage generator 137 that generates the common voltage Vcom which is to be supplied to the common electrodes TX; a selector 131 that transfers one value, selected from the maximum value, the minimum value, and the intermediate value, to the common electrodes according to the selection signal transferred from the touch driver 610; a driving electrode connector 133 that includes a plurality of driving electrode switches 134 for connecting the driving electrode TX to the selector 131 or connecting the driving electrode TX to the common voltage generator 137; a reception electrode connector 135 that includes a plurality of reception electrode switches 136 for connecting the reception electrode RX to the touch driver 610 or connecting the reception electrode RX to the common voltage generator 137; and a touch synchronizer 132 that outputs a touch synch signal, which distinguishes the image output (Display) period and the touch sensing (Touch) period, to the driving electrode connector 133 and the reception electrode connector 135.

The positive voltage generator 138 and the negative voltage generator 142 generate voltages which are used to generate the maximum value, minimum value, and intermediate value of the touch driving voltage VTX, respectively. Here, the terms "positive" and "negative" have a relative meaning. That is, a voltage generated by the positive voltage generator 138 is higher than a voltage generated by the negative voltage generator 142.

Each of the positive voltage generator 138 and the negative voltage generator 142 may be the data voltage generator that generates the data voltage supplied to the data line formed in the panel 110, or may be the gate voltage generator that generates the gate voltage (the scan signal) supplied to the gate line formed in the panel 110.

The intermediate value generator 139 generates the intermediate value VTX_REF of the touch driving voltage VTX by using the voltage supplied from the positive voltage generator 138. The maximum value generator 140 generates the maximum value VTX_HIGH of the touch driving voltage VTX by using the voltage supplied from the positive voltage generator 138. The minimum value generator 141 generates the minimum value VTX_LOW of the touch driving voltage VTX by using the voltage supplied from the negative voltage generator 142.

The common voltage generator 137 generates the common voltage Vcom which is to be applied to the driving electrode TX and the reception electrode RX.

The driving electrode connector 133 includes the plurality of driving electrode switches 134 which are provided between the driving electrodes TX and the selector 131, connect the common voltage generator 137 to the driving electrodes TX during the image output (Display) period, and connect the selector 131 to the driving electrodes TX during the touch sensing (Touch) period. For example, when the touch synch signal output from the touch synchronizer 132 has a high level (e.g., during a Display period), the driving electrode switches 134 connect the driving electrodes TX to the common voltage generator 137, and when the touch synch signal output from the touch synchronizer 132 has a low level (e.g., during a Touch period), the driving electrode switches 134 connect the touch electrodes TX to the selector 131.

The reception electrode connector 135 includes the plurality of reception electrode switches 136 which are provided between the reception electrodes RX and the touch driver 610, connect the common voltage generator 137 to the reception electrodes RX during the image output period, and connect the touch driver 610 to the reception electrodes RX during the touch sensing period. For example, when the touch synch signal output from the touch synchronizer 132 has a high level (e.g., during a Display period), the reception electrode switches 136 connect the reception electrodes RX to the common voltage generator 137, and when the touch synch signal output from the touch synchronizer 132 has a low level (e.g., during a Touch period), the reception electrode switches 136 connect the reception electrodes RX to the touch driver 610.

The touch synchronizer 132 outputs the touch synch signal, which distinguishes the image output period and the touch sensing period, to the driving electrode connector 133 and the reception electrode connector 135.

The selector 131 selects one value from among the intermediate value, the maximum value, and the minimum value, and supplies the selected value to the driving electrode connector 133, according to the selection signal TX_SEL and the touch driving pulse PTX which are transferred from the touch driver 160.

Second, the touch driver 610 includes a touch driver 611 that transfers the selection signal and the touch driving pulse to the selector 131, a receiver 612 that receives the sensing signals from the reception electrodes RX to determine whether there is a touch, and a reference voltage generator 613 that generates the reference voltage VRX_REF to supply the reference voltage VRX_REF to the receiver 612.

Hereinafter, a method of driving the display device according to an embodiment of the present disclosure will be described in detail with reference to FIGS. 6 and 8 to 12.

The method of driving the display device according to an embodiment includes: supplying the common voltage Vcom to the plurality of common electrodes 111 which are separated from each other in a block form in the panel 110 where a plurality of the data lines respectively receiving data voltages and a plurality of the gate lines receiving the gate voltage are formed, during the image output period. The method further includes, in the touch sensing section of the touch sensing period, supplying the touch driving voltage VTX, having the maximum value and the minimum value which are generated from voltages supplied from the data voltage generators 138 and 142 generating the data voltages or the gate voltage generators 138 and 142 generating the gate voltage, to the driving electrode TX of the common electrodes 111. The method further includes, in a touch non-sensing section of the touch sensing period, supplying the intermediate value of the maximum value and the minimum value to the driving electrode TX. Additionally, the method includes determining whether there is a touch in the touch sensing section, by using a sensing signal received from the reception electrode RX of the common electrodes 111. Here, during the touch sensing period, the reference voltage having the same value as the intermediate value (applied to the driving electrode TX) is applied to the reception electrode RX.

The details will be described below in detail. Reference numerals illustrated in FIG. 12 will be briefly described.

In FIG. 12, Display refers to the image output period, Touch refers to the touch sensing period, Touch Sync refers to the touch sync signal, TX_SEL from TIC refers to the selection signal TX_SEL supplied from the touch driver (TIC) 610 to the selector 131 of the display driver (DDI) 119, DDI from TIC (PTX1 to PTXm) refer to a plurality of the touch driving pulses PTX supplied from the touch driver (TIC) 610 to the selector 131 of the display driver (DDI) 119, and PNL from DDI (VTX1 to VTXm) refer to the touch driving voltages VTX supplied from display driver (DDI) 119 to the respective driving electrodes TX formed in the panel (PNL) 110.

DDI from TIC (PTX1 to PTXm) refer to the touch driving pulses PTX, which are generated by the number of the driving electrodes TX. The touch driving pulses, as illustrated in FIG. 12, are sequentially generated in correspondence with the driving electrodes TX, and are supplied to the selector 131.

PNL from DDI (VTX1 to VTXm) refer to the touch driving voltage VTX, and as shown in FIG. 12, the touch driving voltage VTX are sequentially supplied to the driving electrodes TX. To this end, the driving electrode switches 134 of FIG. 11 are sequentially connected to the selector 131.

First, during the image output period Display, the common voltage VCOM is supplied from the display driver 119 to the driving electrodes TX and sensing electrodes RX of the panel 110. That is, the image output period is a period in which an image is output to the panel 110, and the panel 110 outputs an image by using the common voltage VCOM. When the panel 110 is a liquid crystal panel, a light transmittance of liquid crystal injected into the liquid crystal panel is changed according to the common voltage VCOM applied to the driving electrodes TX and the reception electrodes RX and the data voltage applied to the panel 110, and thus, an image is output.

Second, referring to FIG. 12, when the touch sync signal is shifted from a high level to a low level during the image output period, the driving electrode switches 134 (of FIG. 11) connect the driving electrodes TX to the selector 131, and the reception electrode switches 136 (also shown in FIG. 11) connect the reception electrodes RX to the receiver 612.

In this case, when the selection TX_SEL1 has a low level, the selector 131 supplies the touch driving voltage VTX having the intermediate value VTX_REF to the driving electrodes TX.

Third, in a state where the touch sync signal has a low level, when a first selection signal TX_SEL1 having a high level is received from the touch driver 611, the selector 131 supplies a pulse-type first touch driving voltage VTX1 corresponding to a first touch driving pulse PTX1 to a first driving electrode TX1 of the driving electrodes TX, and continuously supplies the intermediate value VTX_REF to the other driving electrodes TX2 to TXm. The first touch driving voltage VTX1 swings between the maximum value (VTX_HIGH) and the minimum value (VTX_LOW).

Fourth, in a state where the touch sync signal has a low level, when the first selection signal is shifted to a low level, the selector 131 applies the intermediate value VTX_REF to the first driving electrode TX1 and the other driving electrodes TX.

The intermediate value VTX_REF is continuously supplied to the first driving electrode TX1 during the other section (the touch non-sensing section) of the touch sensing period.

Fifth, in a state where the touch sync signal has a low level, when a second selection signal TX_SEL2 having a high level is received by the display driver 119, the display driver 119 supplies a second touch driving voltage VTX2 to a second driving electrode TX2 by using the same method as the method which has been described above in the first to fourth operations.

Subsequently, the above-described operations are sequentially performed for third to mth driving electrodes TX3 to TXm.

During the touch sensing period Touch, the receiver 612 receives a plurality of sensing signals from the reception electrodes RX through the display driver 119, and the touch driver 610 determines whether there is a touch, by using the sensing signals.

During the touch non-sensing section occupying most of the touch sensing period, the intermediate value VTX_REF (which is the same as the reference voltage VRX_REF applied to the reception electrodes RX) of the maximum value and the minimum value is applied to the driving electrodes TX, and thus, voltage differences between the driving electrodes TX and the reception electrodes RX are reduced, thereby preventing block dim from occurring in the panel 110.

Figure 13:
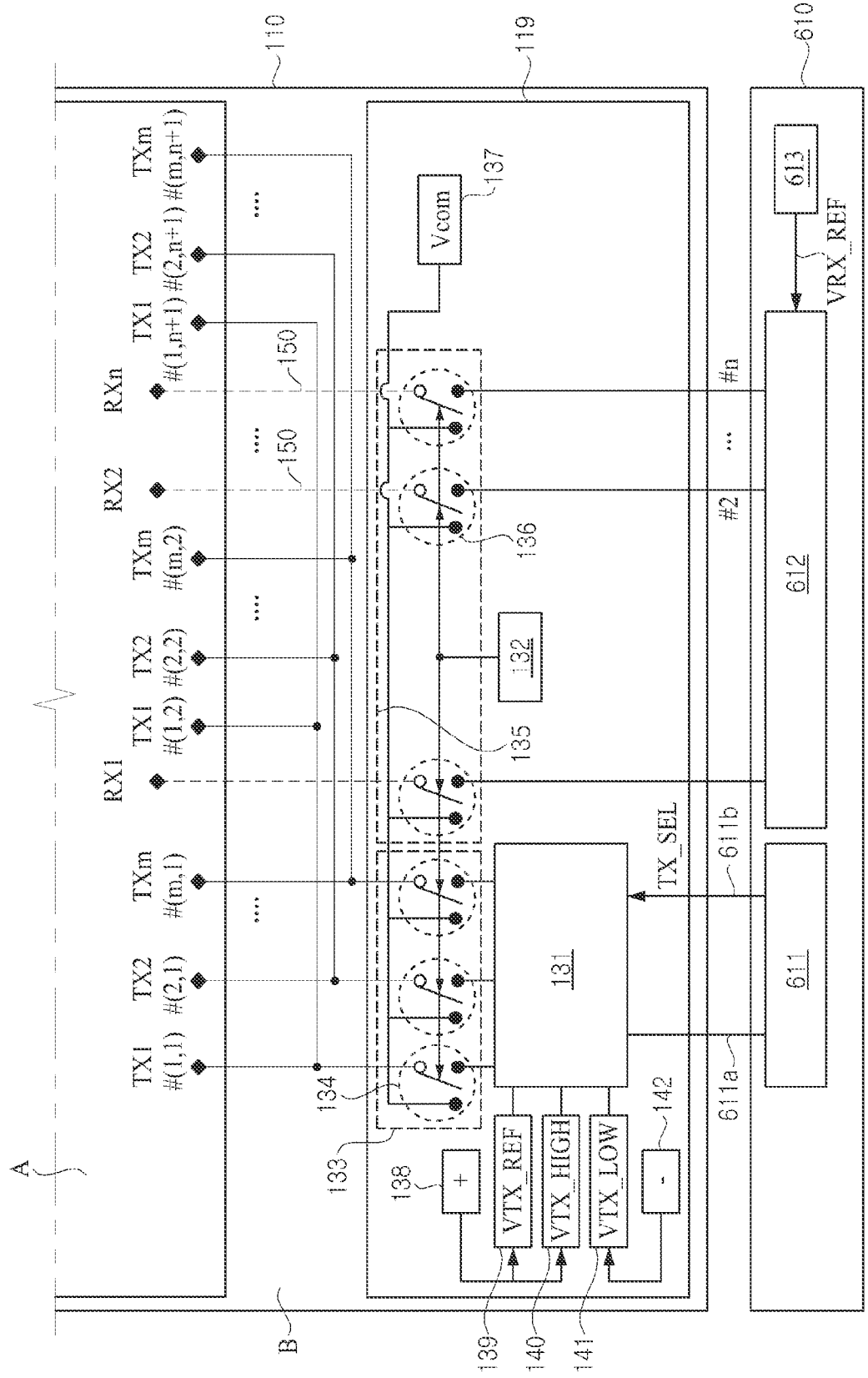
FIG. 13 is another exemplary diagram illustrating a configuration of a display driver applied to the display device according to the first embodiment of the present disclosure.
Figure 14:
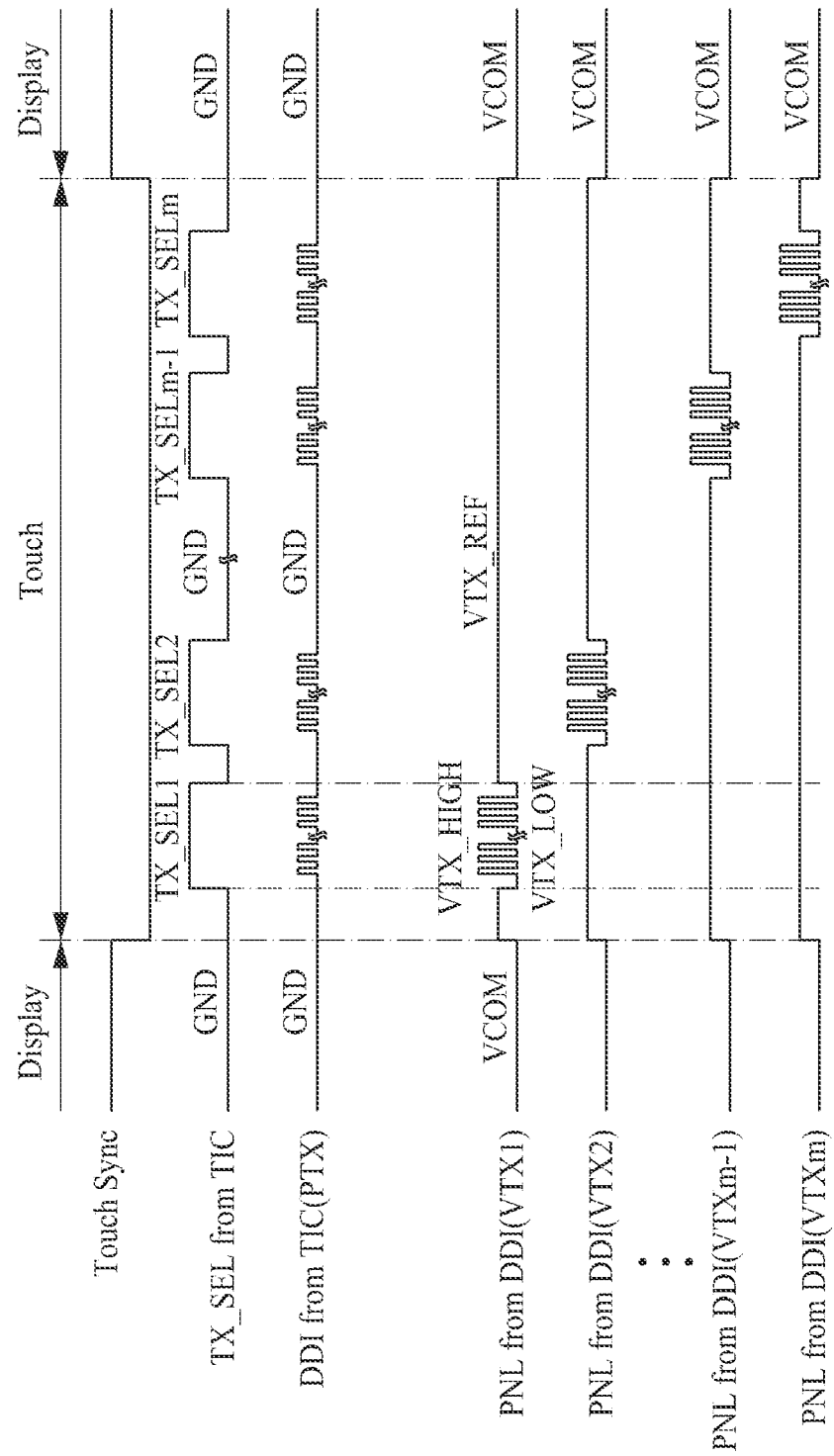
FIG. 14 is an exemplary diagram showing a touch driving voltage generated by the display driver of FIG. 13.

FIG. 13 is another exemplary diagram illustrating a configuration of a display driver applied to the display device according to the first embodiment of the present disclosure, and FIG. 14 is an exemplary diagram showing a touch driving voltage generated by the display driver of FIG. 13.

A configuration and function of a display driver applied to the display device according to the second embodiment of the present disclosure are mostly the same as those of the display driver applied to the display device according to the first embodiment.

For brevity, only the configurations and functions which differ from those of the display driver applied to the display device according to the first embodiment will be described with reference to the display driver of the second embodiment.

In a display driver 610 according to the second embodiment, the touch driver 611 is serially connected to the selector 131.

Therefore, as illustrated in FIGS. 13 and 14, the touch driving pulses PTX are sequentially supplied to the selector 131 through one touch driving pulse line 611a. In this case, the selection signal TX_SEL is supplied to the selector 131 through a selection signal line 611b.

In contrast, in the display driver 610 according to the first embodiment (explained with reference to FIGS. 11 and 12), the touch driver 611 is connected to the selector 131 through a plurality of the parallel touch driving pulse lines 611a. Therefore, as shown in FIG. 12, the touch driving pulses PTX respectively corresponding to the touch electrodes TX are separately supplied to the selector 131 through the touch driving pulse line 611a. In this case, the selection signal TX_SEL is supplied to the selector 131 through the selection signal line 611b.

To provide an additional description, except that the touch driving pulses PTX are sequentially supplied to the selector 131 through one touch driving pulse line 611a, the display driver 610 according to the second embodiment has the same configuration and function as those of the display driver 610 according to the first embodiment.

According to these embodiments, among a plurality of common electrodes including the first and second common electrodes which are separated from each other in a block form, since a portion in which the first common electrode line connected to the first common electrode overlaps the second common electrode is reduced, a parasitic capacitance which occurs between the first common electrode line and the second common electrode can decrease. Therefore, a touch sensitivity can be enhanced, and a touch error can decrease.

Moreover, according to these embodiments, block dim caused by a difference between root means square values of voltages (respectively supplied to the common electrodes which are formed in a block form) can be reduced during the touch sensing period.

It will be apparent to those skilled in the art that various modifications and variations can be made to the present disclosure without departing from the spirit or scope of the disclosure. Thus, it is intended that the present disclosure covers such modifications and variations.

What is claimed is:

1. A display device comprising:
a first common electrode line connected to a first common electrode of a plurality of common electrodes, and formed to overlap a data line formed in a panel where the plurality of common electrodes are formed, wherein the plurality of common electrodes are separated from each other in a block form, receive a common voltage in an image output period, and receive a touch driving voltage in a touch sensing period; and
a second common electrode separated from the first common electrode line with a protective layer therebetween, and configured to include two second common electrode plates separated from each other on a left and a right side of the first common electrode line.

2. The display device of claim 1, wherein the two second common electrode plates are connected to each other in at least one area overlapping the first common electrode line.

3. The display device of claim 1, wherein a separation between the second common electrode plates is less than a width of the first common electrode line.

4. The display device of claim 1, wherein during the touch sensing period, a plurality of touch driving voltages having a same level are respectively supplied to the plurality of common electrodes including the first and second common electrodes.

5. The display device of claim 1, wherein,
the plurality of common electrodes comprise:
a plurality of reception electrodes formed in parallel with the data line in a block form, and
a plurality of driving electrode parts disposed between the plurality of reception electrodes, the plurality of driving electrode parts formed in a block form in the panel,
the plurality of driving electrode parts comprise the first and the second common electrodes,
the plurality of driving electrode parts, which are formed in parallel with a gate line formed in the panel, constitute a driving electrode,
the panel comprises a plurality of driving electrodes including the driving electrode, and
the first and second common electrodes are driven differently for each of the plurality of driving electrodes.

6. The display device of claim 1, wherein,
the plurality of common electrodes comprise:
a plurality of driving electrodes configured to receive the touch driving voltage during the touch sensing period, and
a plurality of reception electrodes configured to receive a sensing signal generated from the touch driving voltage,
during the touch sensing period, a touch driver that generates a selection signal for generating the touch driving voltage determines whether there is a touch, by using a plurality of sensing signals respectively received from the plurality of reception electrodes, and
a display driver generates the touch driving voltage to supply the touch driving voltage to the plurality of driving electrodes and transfers the plurality of sensing signals, respectively received from the plurality of reception electrodes, to the touch driver according to the selection signal.

7. The display device of claim 6, wherein the display driver generates a maximum value and a minimum value of the touch driving voltage having a pulse type and an intermediate value of the maximum value and the minimum value by using a voltage supplied from a data voltage generator or a voltage supplied from a gate voltage generator, the data voltage generator generating a data voltage supplied to the data line and the gate voltage generator generating a gate voltage supplied to the gate line.

8. The display device of claim 7, wherein the intermediate value is the same as a reference voltage applied to the plurality of reception electrodes during the touch sensing period.

9. A method of driving a display device, the method comprising:
supplying, during an image output period, a common voltage to a plurality of common electrodes which are separated from each other in a block form in a panel, wherein a plurality of data lines respectively receiving data voltages and a plurality of gate lines receiving a gate voltage are formed in the panel;
supplying, to a driving electrode of the plurality of common electrodes, in a touch sensing section of a touch sensing period, a touch driving voltage, having a maximum value and a minimum value, the maximum and the minimum values being generated from a voltage supplied from a data voltage generator generating the data voltages or from a gate voltage generator generating the gate voltage,
supplying, to the driving electrode, in a touch non-sensing section of the touch sensing period, an intermediate value of the maximum value and the minimum value; and
determining whether there is a touch in the touch sensing section, by using a sensing signal received from a reception electrode of the plurality of common electrodes.

10. The method of claim 9, wherein during the touch sensing period, a reference voltage having the same value as the intermediate value is applied to the reception electrode.

* * * * *